Feb. 6, 1962 K. C. PERKINS 3,020,403

ANTI-CAPTURE SIGNAL RECEIVING APPARATUS

Filed Oct. 29, 1957 2 Sheets-Sheet 1

INVENTOR.
KENNETH C. PERKINS
BY Walter J. Kreske
ATTORNEY

Feb. 6, 1962 K. C. PERKINS 3,020,403

ANTI-CAPTURE SIGNAL RECEIVING APPARATUS

Filed Oct. 29, 1957 2 Sheets-Sheet 2

INVENTOR.
KENNETH C. PERKINS
BY Walter J. Kreske
ATTORNEY

United States Patent Office
3,020,403
Patented Feb. 6, 1962

3,020,403

ANTI-CAPTURE SIGNAL RECEIVING APPARATUS

Kenneth C. Perkins, Lynnfield Centre, Mass., assignor to General Electronic Laboratories, Inc., Cambridge, Mass., a corporation of Massachusetts Filed Oct. 29, 1957, Ser. No. 694,694
11 Claims. (Cl. 250—20)

This invention relates to the overcoming of interference between radio frequency signals and more particularly to apparatus for extracting modulation information from the weaker of two carrier frequency signals.

An important problem in the field of radio communication is that of achieving intelligible reception of modulation information in a desired carrier frequency signal despite the presence of other interfering signals. This problem is particularly serious where the desired information signal is weaker than the interfering signal. The reason for this is that an inherent characteristic of conventional radio receivers is that they cause the stronger of two simultaneously received signals to dominate the weaker signal. Thus, if an interfering signal, having a strength herein represented by the letter J, reaching the receiver is stronger than an information signal, having a strength herein represented by the letter S, to form an input strength ratio $J/S$, greater than unity, the strength ratio of the signal at the receiver output will be further increased by the receiver. This tendency for the stronger signal to dominate the weaker signal is herein termed "capture effect."

This "capture effect" in receivers is desirable in those instances where the information signal is stronger than the interfering signal. In such instances, it assists in the intelligibility of the information signal despite the interference. However, the more usual situation is one wherein the weaker signal is the desired information signal and the stronger signal is the interfering signal. In this common situation, the capture effect in a conventional receiver further detrimentally weakens the information signal in favor of the interfering signal and makes the desired information less intelligible.

Pursuant to the present invention, this problem has been overcome in an apparatus which succeeds in not only overcoming the capture effect, but also in desirably reversing the capture effect (herein termed "anti-capture effect") to thereby make the weaker signal dominate the stronger signal. In addition to achieving this extremely important signal selecting characteristic, the present invention also includes other desirable features and advantages. Among the other features and advantages achieved by the present invention is that of using the stronger interfering signal to assist in the conveyance of the desired information of the weaker signal. Another advantage achieved is that of adaptability of the present invention for use with conventional receiver components without increasing size and complexity over that of conventional radio receivers. A further advantage is the achievement of an apparatus which lends itself to compact construction and which is reliable in its operation.

Accordingly, a primary object of the present invention is the provision of an apparatus for extracting the modulation information from the weaker of two oscillatory electric carrier frequency signals.

Another object is the provision of an apparatus for extracting the modulation information from the weaker of two interfering radio frequency signals.

Another object is the provision of an apparatus for extracting the frequency modulation information from the weaker of two frequency modulation signals even through these signals occupy the same or overlapping bandwidths.

And another object is the provision of an apparatus for extracting the amplitude modulation information from the weaker of two single frequency carrier signals when the difference frequency of these signals is substantially greater than the modulation frequency.

And a further objpect is the provision of an apparatus adapted for using the stronger of two carrier frequency signals for assisting in the extraction of the modulation information of the weaker of the two carrier frequency signals.

A still further object is the provision of a reverse capture type radio frequency receiver apparatus which lends itself to compact construction, utilization of conventional receiver components, and to providing reliable operation.

These features, objects and advantages of the invention will become more apparent from the following description of a preferred embodiment taken in connection with the accompanying drawings and wherein.

Figures 1, 2, 3, 4:
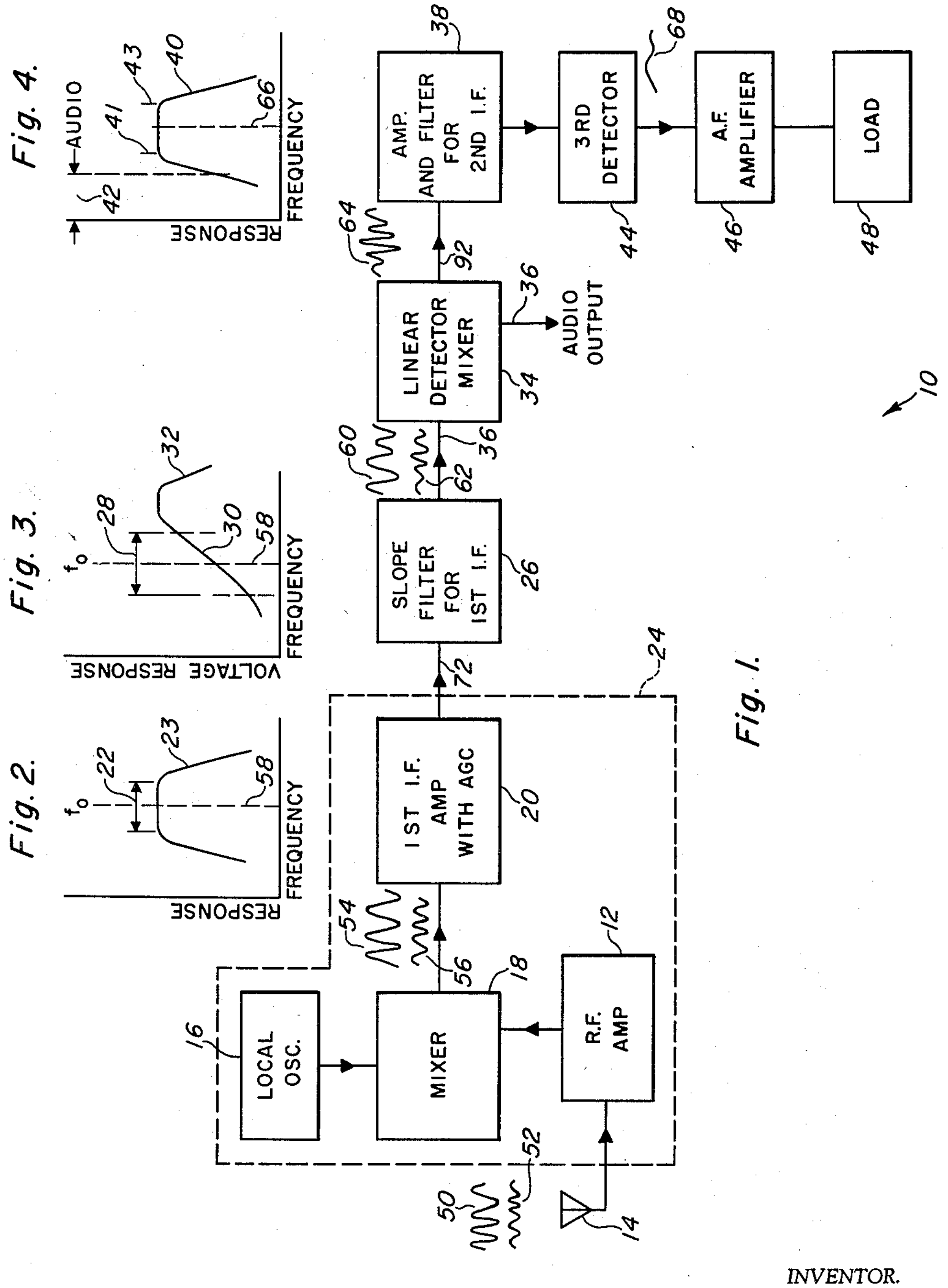
FIG. 1 is a block diagram of a radio frequency receiver made in accordance with the present invention.
FIG. 2 is a diagram illustrating bandwidth characteristics of an intermediate frequency amplifier shown in FIG. 1.
FIG. 3 is a diagram illustrating a slope filter response characteristic of the first intermediate frequency filter shown in FIG. 1.
FIG. 4 is a diagram illustrating the response characteristics of the second intermediate frequency amplifier shown in FIG. 1.

Referring to FIG. 1 in more detail, an apparatus for extracting modulation information of the weaker of two radio frequency signals is shown as a block diagram which is designated generally by the numeral 10, and which in the present instance is a radio receiver for frequency modulation signals. The receiver 10 has a radio frequency amplifier 12 which may be of conventional design for frequency modulation signals and to the input of which is connected an antenna 14. The output of the radio frequency amplifier 12 is fed with the output of a local oscillator 16 to a conventional mixer circuit 18. The output of the mixer circuit 18 is fed to a first intermediate frequency amplifier 20. The amplifier 20 may be of conventional design for use with frequency modulation signals and has a filter characteristic incorporated therein with a bandwidth 22 and response characteristic shown by curve 23 in FIG. 2. The intermediate frequency amplifier 20 is preferably of the type incorporating automatic gain control as distinguished from signal limiting for maintaining constant amplitude signal output. Use of automatic volume control in place of a limiter has been found to assist in reducing capture effect. The radio frequency amplifier 12, local oscillator 16, mixer 18, and the first intermediate frequency amplifier 20 together form the front end or head of a conventional superheterodyne receiver 24.

The output of the first intermediate frequency amplifier 20 is fed to a slope filter circuit 26 for the first intermediate frequency and having off peak tuning such that the desired signal bandwidth 28 (FIG. 3) occurs on a substantially linear slope portion 30 of a response characteristic of the filter 26 shown by a curve 32. The bandwidth 28 may be the same as the bandwidth 22 as will be hereinafter more fully described.

The output of the first intermediate frequency filter 26 is fed to a linear diode detector mixer 34 having an audio output line 36 for use when no interfering signal exists as will be hereinafter more fully described. Linear detector mixer as used herein means a detector having an output signal substantially proportional to the input signal throughout the useful range of the detector. The output of the linear diode detector mixer 34 is also fed to an amplifier and filter circuit 38 for a second intermediate frequency. The second intermediate frequency amplifier 38 may be of conventional design and incorporates a filter with a response characteristic shown by a curve 40 (FIG. 4) and having preferably a sharp cutoff at the audio frequency spectrum 42 as will be hereinafter further described.

The output of the second intermediate frequency amplifier 38 is fed to a third detector 44 whose function is that of demodulating the amplitude modulation of the signal output of the second intermediate frequency amplifier 38. The output of the third detector 44 will approximate modulation of the smaller of two input signals to the receiver 10 as will be further described. The output of the third detector 44 is fed to a conventional audio frequency amplifier 46 for suitable amplification before being applied to a load 48, such as a speaker, meter, recorder or other suitable device.

In the operation of the receiver 10, a pair of frequency modulated radio frequency signals 50 and 52 in the same frequency band are picked up by the antenna 14 and fed to the radio frequency amplifier 12. The radio frequency signals 50 and 52 are of different amplitudes or strengths with the weaker signal 52 carrying the desired frequency modulation information. The problem thus presented is that of extracting the modulation information from the weaker radio frequency signal 52 despite the simultaneous appearance of the stronger frequency modulated radio frequency signal 50 appearing in the same radio frequency band. In the conventional manner of superheterodyne receivers, the signals 50 and 52 are suitably amplified in the radio frequency amplifier 12 and fed to the mixer 18 along with a strong signal from the local oscillator 16. The first detector or mixer 18 being a non-linear device combines with the local oscillator 16 to generate among other frequencies new modulated signal components 54 and 56 corresponding to the original signals 50 and 52 respectively, but with a change in the carrier frequency at any instant equal to the difference between the original carrier frequency and the frequency of the local oscillator 16 at the same instant. The new signals 54 and 56, corresponding to signals 50 and 52 respectively, at the new carrier frequencies are modulated by the same percentage as that of the original signals 50 and 52 respectively. The signals 54 and 56 within the bandwidth 22 about a center carrier frequency 58 are suitably amplified in the first intermediate frequency amplifier 20 substantially free of amplitude modulation because of the automatic gain control in the amplifier 20.

The output of the first intermediate frequency amplifier 20 is fed to the first intermediate frequency filter 26. The filter 26, instead of having peak response tuning at the center frequency 58 of the frequency modulated signals 54 and 56, has off-peak tuning so that the center frequency 58 in bandwidth 28 is actually operating on the substantially linear slope 30 of the resonant characteristic curve 32 of the filter 26.

The object of operating on the slope 30 is to impart some amplitude modulation containing the same intelligence as the frequency modulation in the signal components 54 and 56 by using that portion 30 of the characteristic curve 32 which is linear. Thus, the filter 26 will have in its output two signal components 60 and 62 corresponding to the signal components 54 and 56 respectively from the first intermediate frequency amplifier 20. Each of the signal components 60 and 62 is amplitude modulated with the frequency modulation intelligence in the respective signals 54 and 56. The signal component 60 continues to be the stronger and the signal component 62 continues to be the weaker signal with substantially the same proportion as the original signals 50 and 52 respectively.

The amplitude modulated signals 60 and 62 are fed from the first intermediate frequency filter 26 to the linear diode detector mixer 34 which mixes in the manner of a converter. One of the signal components resulting from this mixing has a beat-frequency equal at each instant to the instantaneous difference frequency of the frequency modulation signals 60 and 62 and is represented as the frequency and amplitude modulation curve 64 whose amplitude is controlled mainly by the smaller signal 62 of the two signals 60 and 62.

The output of the linear diode detector mixer 34, including the difference frequency signal component 64 carrying the amplitude modulation of the signal 62, is fed to the second intermediate frequency amplifier 38. An important characteristic of the second intermediate frequency amplifier 38 is that its response characteristic curve 40 has a bandwidth between the points 41 and 43 covering a range of frequencies covered by the amplitude modulated signal component 64 about a new center frequency carrier 66 the determination of which will be hereinafter further described. Since the amplitude modulation of the signal 64 is in the audio range 42, the frequency selectivity of the second intermediate frequency amplifier 38 lies between the bandwidth points 41 and 43 with a sharp cutoff characteristic below the point 41, above the audio frequency range 42. Also the upper cutoff frequency 43 is preferably no higher than the highest possible difference frequency term of the signal components 60 and 62 from the linear detector mixer 34. The frequency at point 43 in FIG. 4 will thereby be substantially equal to the bandwidth 22 of FIG. 2. That is, if the bandwidth 22 is for example 150 kilocycles, the upper bandpass frequency 43 would preferably be at 150 kilocycles. The lower bandpass frequency 41 would be an equal number of cycles below the center frequency 66 as the upper frequency 43 is above frequency 66. Therefore, the center frequency is equal to the arithmetic mean of the frequency at 43 and the frequency at 41. In some instances it is desirable that 41 be at about 12 kilocycles. In such case, for the above example the center frequency will be one half of 150 kc. plus 12 kc. or equal to 81 kc. It should be understood here that these are given as exemplary figures and that the present invention is also applicable to other frequency ranges. Thus, the beat note component or carrier frequencies of the signal component 64 are amplified while the audio components in the range 42 are rejected by the second intermediate frequency amplifier 38. The signal component 64 is thereby isolated and suitably amplified in the second intermediate frequency amplifier 38. The output of the amplifier 38 is fed to the third detector 44 which recovers the amplitude modulation of the signal 64 and feeds this modulation signal as the signal 68 to the audio frequency amplifier 46 for amplification to a suitable level before applying to a desired load 48, such as a speaker or other device.

It should be noted that in the event the desired information signal 52 appears at the antenna 14 without the interfering signal 50, there will be no interfering signal 60 at the linear diode detector mixer 34. Therefore, the signal 62 carrying the desired information in amplitude modulation form may be demodulated directly by the linear detector mixer 34 and fed as a suitable audio output in the line 36 to a suitable audio frequency amplifier as the amplifier 46.

Figure 5:
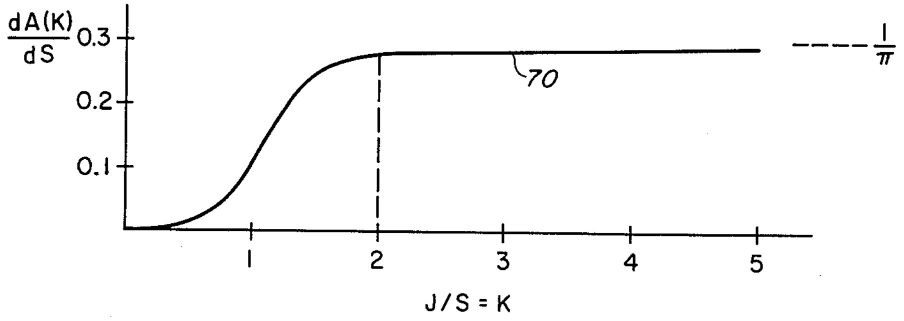
FIG. 5 is a diagram for illustrating an operational characteristic of the embodiment shown in FIG. 1.

For the proper operation of the receiver 10 for extracting the information from the desired signal 52, it has been found necessary that the strength of the radio frequency interfering signal 50 be substantially greater than the weaker information signal 52. The amount by which interfering signal 50 must be greater than the desired information signal 52 may be found by reference to the curve 70 in FIG. 5. If the amplitude of interfering signal 60 at any instant is represented by the letter J and the amplitude of the information signal 62 at the same instant is represented by the letter S, the term $J/S$ at any instant forms a ratio which may be represented by the letter K and is plotted as the abscissa or $x$ axis in FIG. 5. The ordinate or $y$ axis in FIG. 5 represents the derivative $dA/dS$ where A is the amplitude of the beat frequency which would result at the output of a linear diode detector mixer such as shown at 34 in FIG. 1 when the information signal S and interfering signal J are applied at the input to the mixer 34. This applies to both frequency modulation and amplitude modulation signals. In the instance of frequency modulation signals, the beat frequency would be the instantaneous frequency difference between the two signals. The amplitude A is a function of the ratio K. The FIG. 5 representation is taken with the desired signal amplitude S in the ratio K being held constant and equal to unity to show the effect of variations in the amplitude of the interfering signal J on the output beat frequency amplitude A. It has been found that following this procedure, the curve 70 approaches an asymptote at a value of $1/\pi$.

It is seen from the asymptotic nature of the curve 70 that when the amplitude of the interfering signal J reaches or exceeds that of twice the amplitude of the information S, further increase in the interfering signal J has very little effect upon the resulting beat frequency amplitude A. This means that so long as the amplitude of the interfering signal 60 (FIG. 1) is at all times at least twice that of the weaker information signal 62, the amplitude A of a beat frequency signal such as 64 resulting from a combination of the two corresponding signals 60 and 62 in a linear detector mixer such as 34 will follow very closely the amplitude modulation of the information signal 62.

Figure 6:
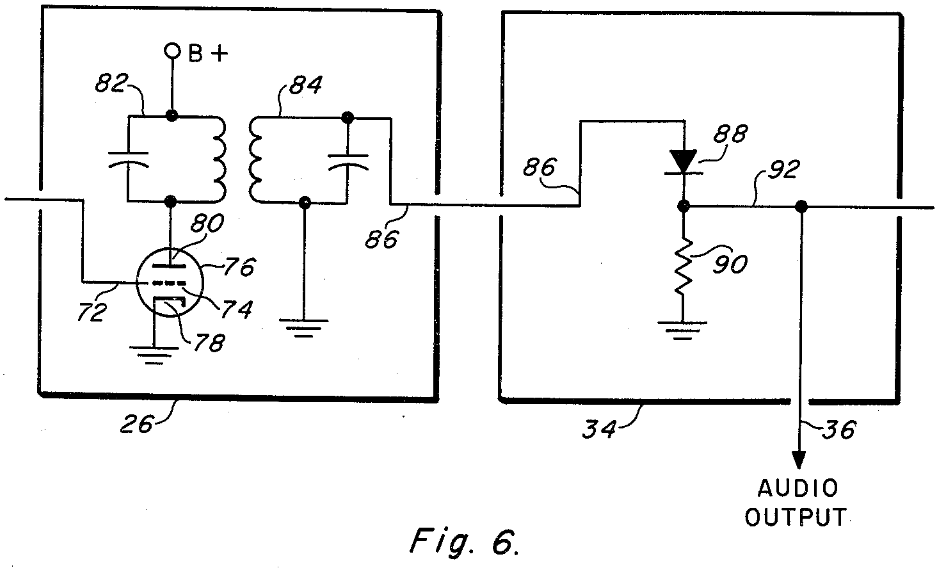
FIG. 6 is a schematic diagram of a first intermediate frequency filter circuit and a linear detector mixer circuit suitable for use in the embodiment shown in FIG. 1.

A circuit suitable for use as the first intermediate frequency filter 26 and a circuit suitable for use as the linear diode detector mixer 34 are shown schematically in FIG. 6. Referring to FIG. 6 in more detail, the first intermediate frequency filter 26 has an input line 72 connected from the first intermediate frequency amplifier 20 to a control grid 74 of an electron tube 76 having a grounded cathode 78 and an anode 80. The operating voltage in line 72 is determined by the output of the 1st I.F. amplifier and AGC circuit 20 and is selected to be normally within the operating range of the tube 76, below the saturation voltage and above the cutoff voltage. The anode 80 is connected to one side of a parallel connected inductive, capacitive, tuned circuit 82, the other side of which is connected to a B+ power source. The inductive, capacitive circuit 82 is inductively coupled to a second parallel connected inductive, capacitive circuit 84, one side of which is grounded and the other side connected through a line 86 to one side of a mixer diode 88, the other side of which is connected through a resistor 90 to ground. A semiconductor type rectifier such as a germanium rectifier has a desirable linear slope characteristic and is suitable for use as the mixer diode 88. An output line 92 from the linear diode detector mixer 34 is connected to a point between the diode 88 and the resistor 90 to feed both the second intermediate frequency amplifier 38 and the audio output line 36.

The inductive, capacitive circuits 82 and 84 are tuned to provide a response characteristic such as explained in connection with the curve 32 in FIG. 3 with a substantial linear portion 30 covering the frequency bandwidth 28 as explained in connection with FIG. 1.

This invention is not limited to the specific details of construction and operation herein disclosed as equivalents will suggest themselves to those skilled in the art.

What is claimed is:

1. In an apparatus for extracting frequency modulation information from the weaker of two frequency modulation carrier signals having overlapping bandwidths, the combination of means for amplitude modulating each of said carrier signals in accordance with the frequency modulation intelligence in the corresponding frequency modulation signal, a linear detector mixer, means for applying said overlapping bandwidth amplitude modulated carrier signals to the linear detector mixer to produce an amplitude modulated frequency modulation carrier signal component having a frequency equal to the difference of the frequencies of said two signals, means coupled to said linear detector mixer for selectively amplifying signals from said linear detector mixer in a range of difference frequencies of said two carriers, and detector means coupled to said selective amplifying means for obtaining the amplitude modulation information from said selectively amplified signals.

2. In an apparatus for extracting frequency modulation information from the weaker of two frequency modulation carrier signals having overlapping bandwidths, the combination of means for amplitude modulating each of said carrier signals in accordance with the frequency modulation intelligence in the corresponding frequency modulation signal, a linear diode detector mixer, means for applying said overlapping bandwidth amplitude modulated carrier signals to the linear detector mixer to produce a pair of amplitude and frequency modulated carrier signal components having frequencies equal to the sum and difference respectively of the frequencies of said two signals, means coupled to said linear detector mixer for isolating one of said amplitude modulated sum and difference frequency modulation carrier components, and detector means coupled to said isolating means for obtaining the amplitude modualtion information from said isolated signal.

3. In an apparatus for extracting frequency modulation information from the weaker of two frequency modulation carrier signals having overlapping bandwidths, the combination of a linear diode detector mixer having an input and an output, means coupled to said detector mixer input for amplitude modulating each of said carrier signals in accordance with the frequency modulation intelligence in the corresponding frequency modulation signal, selective frequency amplifier means coupled to the output of said linear diode detector mixer for amplifying carrier signals in a preselected bandwidth, said bandwidth having a lower cutoff frequency above the highest of said amplitude modulation frequency and a higher cutoff frequency substantially equal to the highest difference frequency between said two frequency modulated signals, and amplitude demodulating means coupled to said isolating emans for extracting the amplitude modulation information in the difference frequency carrier signals.

4. In a radio receiver for extracting the frequency modulation information from the weaker of a pair of frequency modulated electromagnetic signals having overlapping bandwidths, the combination of amplifying means for said signals including a superheterodyne receiving head having a local oscillator and intermediate frequency amplifier with a bandwidth covering a range of frequencies equal to the difference frequencies between the local oscillator and the weaker frequency modulated signal, filter means coupled to the intermediate frequency amplifier, said filter means having a sloped response characteristic in the bandwidth range of said intermediate frequency amplifier, a linear detector mixer coupled to the filter means, a second intermediate frequency amplifier coupled to the linear detector mixer, said second amplifier having a bandwidth including the difference frequencies of signals from the linear detector mixer, and detector means for recovering amplitude modulation of the last mentioned difference frequency signals.

5. In combination, a frequency modulation superheterodyne receiving head including a radio frequency pickup and amplifying means for an information and interfering frequency modulated electromagnetic signals having overlapping bandwidths, an oscillator, a mixer having a non-linear response characteristic coupled to the amplifying means and oscillator, and a first intermediate frequency amplifier with automatic gain control for maintaining substantially constant carrier amplitude and having an operating bandwidth characteristic including the range of difference frequencies between said information signal and local oscillator; an electric signal frequency filter coupled to the first intermediate frequency amplifier, said filter having a substantially linear slope characteristic in the range of frequencies of said bandwidth; a linear diode detector mixer coupled to said filter; a second intermediate frequency amplifier coupled to said linear detector mixer, said second intermediate frequency amplifier having a bandwidth characteristic with a lower cutoff frequency above the audio frequency range and an upper cutoff frequency at substantially the maximum difference frequency between the information and interference signal components from the first intermediate frequency amplifier; a detector coupled to the second intermediate frequency amplifier for demodulating signals from said second intermediate frequency amplifier; an amplifier coupled to said demodulating detector for amplifying said demodulated signals; and means coupled to said last mentioned amplifier for indicating the amplified demodulated signals.

6. An apparatus as in claim 1 wherein said mixer is a linear diode detector mixer.

7. An apparatus as in claim 1 wherein said linear detector mixer includes a rectifier of semiconductor material.

8. An apparatus as in claim 1 wherein said linear detector mixer includes a germanium rectifier.

9. An apparatus as in claim 1 wherein said range of difference frequencies of said selective frequency amplifying means lies above audio frequency range.

10. An apparatus as in claim 1 wherein said range of difference frequencies of said selective frequency amplifier means lies above the amplitude modulation frequencies in said difference frequency signals.

11. An apparatus as in claim 1 wherein said range of difference frequencies of said selective frequency amplifier means lies between upper frequencies of amplitude modulation components and upper difference frequencies of said carrier frequency components.

References Cited in the file of this patent

UNITED STATES PATENTS

| | | |
|---|---|---|
| 2,448,908 | Parker | Sept. 7, 1948 |
| 2,627,023 | Page | Jan. 27, 1953 |
| 2,696,521 | Parker | Dec. 7, 1954 |
| 2,744,961 | Peek | May 8, 1956 |

OTHER REFERENCES

Terman: "Radio Engineering," Third Edition, published 1947 by McGraw-Hill Book Company, Inc., pages 525–527, 542, 543.